O. B. SMITH.
SAW GUARD.
APPLICATION FILED DEC. 10, 1921.
1,428,986. Patented Sept. 12, 1922.
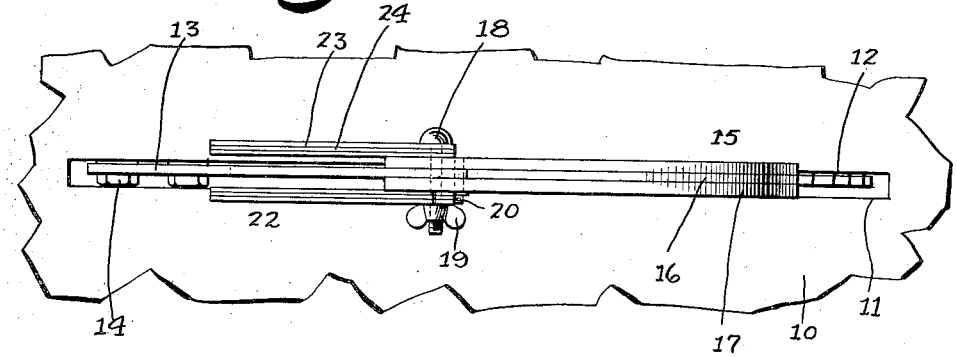
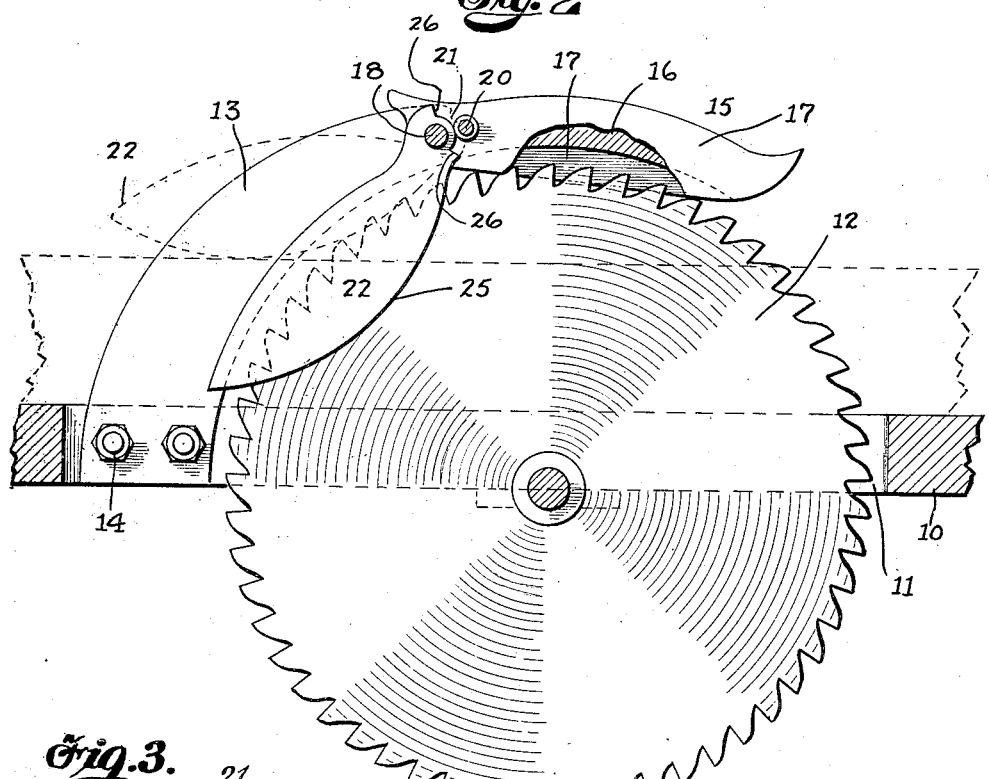
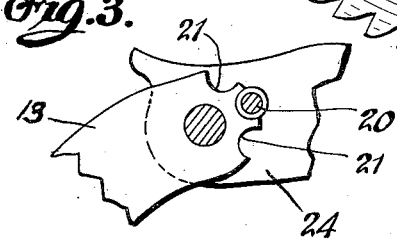
INVENTOR
OTTO B. SMITH.
BY
W. B. Hutchinson,
ATTORNEY Patented Sept. 12, 1922.

1,428,986

UNITED STATES PATENT OFFICE.

OTTO B. SMITH, OF GLEN MORRIS, NEW YORK.

SAW GUARD.

Application filed December 10, 1921. Serial No. 521,344.

*To all whom it may concern:*

Be it known that I, OTTO B. SMITH, a citizen of the United States, and a resident of Glen Morris, Queens County, New York, have invented a new and useful Improvement in Saw Guards, of which the following is a full, clear, and exact description.

My invention relates to improvements in guards for circular saws and other forms of circular cutters. In the specification I refer to a saw, but it will be understood that I use the term in a general sense, and that the invention can be applied to other similar rotary cutters. It is well known that cutting implements of this kind are exceedingly dangerous, and that operatives working on or around them are often injured either from coming in contact with the saw, or from having the stock thrown against them. It is not new to employ a guard to prevent a person from being injured by a saw, but such devices are usually rather expensive, difficult to apply and adjust, and frequently interfere with the work. The object of my invention is to produce a very simple, light, and efficient device of this character, which can be easily applied to a circular saw or the like, which will efficiently guard the saw so as to make it practically impossible for an operative to be accidentally injured by it, and which will not in any way interfere with the work being done. My invention is intended to facilitate rapid working, and in carrying it into effect I place a spreader in the slot of the saw table behind the saw, which will assist in spreading the stock being sawn, and which will support a hood and wings which efficiently cover the saw, but which permit the stock to pass readily through. All of which will be better understood from the description which follows.

Reference is to be had to the accompanying drawings forming a part of this specification, in which similar reference characters indicate corresponding parts in all the views.

Figure 1 is a broken plan view of my invention as applied to a saw and saw table, and Figure 2 is a sectional elevation of the same, and Figure 3 is a detail showing the means of adjusting the hood.

In the drawings I have shown by way of example a conventional saw table 10 which can be of any usual or preferred type, and in which is the customary slot 11 in which the saw 12 or analogous cutter revolves.

In the slot 11 behind the saw I secure a curved spreader 13 which is of about the thickness or perhaps slightly thicker than the saw, and this curves upward and forward over the saw edge. The spreader can be attached in any suitable way, and I have shown it fastened by bolts 14. It will be seen that this will rather facilitate the work of sawing, as the spreader will enter the key made by the saw, and have a tendency to spread the stock so that the saw will not bind.

To the upper and forward end of the spreader I pivot a hood 15 which projects forward and slightly downward over the saw edge so as to cover the teeth, as the drawings clearly show, and while this hood may be of any suitable material, and the invention is not limited to any particular structure of hood, still I prefer to make the middle portion 16 of wood, and the sides 17 of metal, these being allowed to drop down slightly over the edge of the teeth.

The hood is pivoted at its rear end to the spreader 13 preferably by a bolt 18 having a wing nut 19 so that the hood can be quickly fastened or released for adjustment. It is adjusted and held at the desired height by a pin 20 which extends through it, and can be made to register with one of several notches 21 in the end of the spreader, and fastened so as to hold the hood in position. Any suitable bolt or pin can be used for the purpose. The spreader also carries wings 22 which are pivoted on the bolt 18, and swing up and down on opposite sides of the spreader so as to cover the sides of the same, as shown clearly in Figure 2, and each wing is preferably laminated, having the middle portion 24 of wood or fibre, and the outer layer 23 of metal. However, this is not important, and the wing can be made of any suitable material. It has preferably a curved forward edge 25, so that the stock shown by dotted lines in Figure 2 can, as it is sawn, be pushed readily beneath the wings which will rise up and ride on the stock, but still cover a portion of the saw teeth, as shown by dotted lines in Figure 2. The movement of the wings is limited by the shoulders 26 at the forward end of each wing, which are adapted to abut with the pin 20 aforesaid.

The invention is not restricted to the particular means of pivoting or fastening the wings, or the particular means of pivoting or fastening the hood, although I have shown the preferred way. It is essential, however, to have the spreader curve up behind the saw opposite the teeth thereof, and to have the general arrangement of hood and wings shown, and also to have said wings and hood pivotally and adjustably supported on the spreader.

From the foregoing description it will be seen that I have provided a very simple, inexpensive, and efficient guard, which can be readily applied to a saw, and which permits the saw to be used as efficiently as if no attachment were applied thereto or used in connection therewith; and it will further be observed that the simple attachment shown covers practically all the saw except the part of the front edge which is necessarily exposed to receive the stock being operated on.

I claim:—

1. The combination with a circular saw or the like, of a member arranged behind and in alignment with the saw, said member curving upward over the saw edge, rearwardly extending wings pivoted on said member and adapted to overlap the sides of the saw, and a hood pivoted on the upper end of said member and extended forwardly therefrom over the saw edge, said hood being supported at its pivoted end only and disposed so as to leave the front edge of the saw exposed to view.

2. The herein described guard for saws and the like comprising a spreader adapted to be supported behind and in alignment with the saw, said spreader being arranged to curve up over the saw edge, rearwardly trailing wings pivoted on the upper part of the spreader and swinging vertically at its sides so as to overlap the saw, and a hood pivoted at the upper part of the spreader and extending forwardly therefrom, said hood being adapted to cover the upper edge and upper side portions of the saw leaving the front edge exposed to view.

3. A guard for saws and the like, comprising a curved spreader adapted to be secured behind and in alignment with the saw, rearwardly trailing wings pivoted on the upper part of the spreader and on opposite sides thereof so as to overlap the saw, a hood pivoted on the spreader and projecting forwardly therefrom to cover the top and sides of the saw leaving the front edge exposed to view, and means for adjusting the hood.

4. The combination with a circular saw or the like, of the spreader secured behind and in alignment with the saw and curving upwardly and forwardly opposite the saw teeth, wings pivoted on opposite sides of the spreader at its upper portion and arranged to swing freely and overlap the saw, means for restricting the movement of the wings, a hood pivotally supported on the upper end of the spreader and projecting forwardly therefrom, said hood being constructed to overlap the top and sides of the saw leaving the front edge exposed to view, and means for adjusting the position of the hood.

5. The combination with a circular saw or the like, of a spreader secured in alignment with the saw and behind the same, said spreader extending upward and forward opposite the saw edge, and having notches at its forward edge, wings pivoted on the side of the spreader and overlapping the rear portion of the saw, a hood pivoted on the spreader and projecting forwardly therefrom, said hood being adapted to cover the saw edge, and a pin in the hood adapted to engage the notches of the spreader.

OTTO B. SMITH.

Witnesses:
ERNST VETTER,
MATHIAS W. STOCK.